United States Patent
Li

(10) Patent No.: US 12,063,167 B2
(45) Date of Patent: Aug. 13, 2024

(54) RESOURCE CONFIGURATION METHOD AND APPARATUS, DEVICE, AND STORAGE MEDIUM

(71) Applicant: Tencent Technology (Shenzhen) Company Limited, Shenzhen (CN)

(72) Inventor: Hao Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 241 days.

(21) Appl. No.: 17/505,427

(22) Filed: Oct. 19, 2021

(65) Prior Publication Data
US 2022/0038389 A1 Feb. 3, 2022

Related U.S. Application Data

(63) Continuation of application No. PCT/CN2020/127722, filed on Nov. 10, 2020.

(30) Foreign Application Priority Data

Jan. 9, 2020 (CN) .......................... 202010022010.0

(51) Int. Cl.
*A63F 13/69* (2014.01)
*H04L 47/70* (2022.01)

(52) U.S. Cl.
CPC .............. *H04L 47/82* (2013.01); *A63F 13/69* (2014.09)

(58) Field of Classification Search
CPC .......... H04L 47/82; H04L 47/78; A63F 13/69; A63F 13/35
(Continued)

(56) References Cited

U.S. PATENT DOCUMENTS

2007/0032287 A1* 2/2007 Osawa .................... G07F 17/32
463/16
2014/0287830 A1* 9/2014 Katou .................... A63F 13/69
463/31
(Continued)

FOREIGN PATENT DOCUMENTS

CN        105656810 A        6/2016
CN        107690127 A        2/2018
(Continued)

OTHER PUBLICATIONS

Tencent Technology, WO, PCT/CN2020/127722, Feb. 20, 2021, 5 pgs.
(Continued)

*Primary Examiner* — Meng Vang
(74) *Attorney, Agent, or Firm* — Morgan, Lewis & Bockius LLP

(57) ABSTRACT

This application provides a resource configuration method performed by a computer device. The method includes: acquiring configuration data including m candidate configuration resources to configure a target item in a target application, m being a positive integer; selecting, from the m candidate configuration resources according to scenario identification information respectively corresponding to the m candidate configuration resources, n candidate configuration resources matching a current operating scenario of the target application, n being a positive integer less than or equal to m; selecting a target configuration resource from the n candidate configuration resources according to weights respectively corresponding to the n candidate configuration resources; and configuring the target item by using the target configuration resource. Therefore, configuration resources are directly acquired, and the configuration resources are updated independently of version update, thereby reducing (Continued)

costs of replacing the configuration resources and shortening the time of replacing the configuration resources.

20 Claims, 8 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2015/0031440 | A1* | 1/2015 | Desanti | A63F 13/822 463/25 |
| 2018/0147491 | A1* | 5/2018 | Lowery | A63F 13/67 |
| 2019/0129753 | A1 | 5/2019 | Chen et al. | |
| 2019/0192974 | A1* | 6/2019 | Eatedali | A63F 13/69 |
| 2019/0378316 | A1 | 12/2019 | Hushchyn et al. | |
| 2020/0114267 | A1* | 4/2020 | Sakurai | A63F 13/5372 |
| 2020/0394051 | A1 | 12/2020 | Chen et al. | |

FOREIGN PATENT DOCUMENTS

| | | |
|---|---|---|
| CN | 107861816 A | 3/2018 |
| CN | 108874539 A | 11/2018 |
| CN | 109032793 A | 12/2018 |
| CN | 110201397 A | 9/2019 |
| CN | 110474918 A | 11/2019 |
| CN | 111259019 A | 6/2020 |
| JP | H 0916195 A | 1/1997 |
| JP | 2004081346 A | 3/2004 |
| JP | 2004230071 A | 8/2004 |
| JP | 2006332794 A | 12/2006 |
| JP | 2014225061 A | 12/2014 |

OTHER PUBLICATIONS

Tencent Technology, IPRP, PCT/CN2020/127722, Jul. 12, 2022, 6 pgs.
Tencent Technology, Japanese Office Action, JP Patent Application No. 2021-564820, Jul. 25, 2023, 11 pgs.
Tencent Technology, Korean Office Action, KR Patent Application No. 10-2021-7033800, Jul. 1, 2023, 25 pgs.
Tencent Technology, ISR, PCT/CN2020/127722, Feb. 20, 2021, 2 pgs.
Tencent Technology, Singapore Office Action, SG Patent Application No. 11202111714Q, May 15, 2023, 10 pgs.
Tencent Technology, Japanese Office Action, JP Patent Application No. 2021-564820, Jan. 31, 2023, 8 pgs.

* cited by examiner

US 12,063,167 B2

RESOURCE CONFIGURATION METHOD AND APPARATUS, DEVICE, AND STORAGE MEDIUM

CROSS-REFERENCE TO RELATED APPLICATIONS

This application is a continuation application of PCT Patent Application No. PCT/CN2020/127722, entitled "RESOURCE ALLOCATION METHOD AND APPARATUS, DEVICE, AND STORAGE MEDIUM" filed on Nov. 10, 2020, which claims priority to Chinese Patent Application No. 202010022010.0, filed with the State Intellectual Property Office of the People's Republic of China on Jan. 9, 2020, and entitled "RESOURCE CONFIGURATION METHOD AND APPARATUS, DEVICE, AND STORAGE MEDIUM", all of which are incorporated herein by reference in their entirety.

FIELD OF THE TECHNOLOGY

Embodiments of this application relate to the technical field of computers, and in particular, to a resource configuration method and apparatus, a device, and a storage medium.

BACKGROUND OF THE DISCLOSURE

As customer's requirements for game experience gradually increase, a game client also needs to be frequently updated.

In a related art, a series of picture paths are configured inside a game package through a local table of a client, a corresponding picture path is then found in a configuration table according to random data and a keyword index, and a picture is loaded through the picture path and displayed in a user interface.

In the related art, the configuration needs to be performed locally on the client. Therefore, picture replacement can be realized only through version update of the client. As a result, it is costly and time-consuming to perform picture replacement.

SUMMARY

Embodiments of this application provide a resource configuration method and apparatus, a device, and a storage medium, so as to reduce costs of replacing configuration resources and shorten the time of replacing the configuration resources. The technical solutions are as follows.

According to one aspect of this application, a resource configuration method is performed by a computer device, the method including:
  acquiring configuration data including m candidate configuration resources to configure a target item in a target application, m being a positive integer;
  selecting, from the m candidate configuration resources and according to scenario identification information respectively corresponding to the m candidate configuration resources, n candidate configuration resources matching a current operating scenario of the target application, the scenario identification information indicating operating scenarios to which the candidate configuration resources are applicable, n being a positive integer less than or equal to m;
  selecting a target configuration resource from the n candidate configuration resources according to weights respectively corresponding to the n candidate configuration resources, the weights indicating probabilities of selection of the candidate configuration resources; and
  configuring the target item by using the target configuration resource.

According to another aspect of this application, a resource configuration method is provided, applied to a terminal, the method including:
  acquiring configuration data including m candidate picture resources to configure a user interface in a game application, m being a positive integer;
  selecting, from the m candidate picture resources, n candidate picture resources adapted to a current operating scenario of the game application, n being a positive integer less than or equal to m;
  selecting a target picture resource from the n candidate picture resources; and
  displaying the target picture resource in the user interface.

According to another aspect of this application, a computer device is provided, including a processor and a memory, the memory storing at least one program, and the at least one program being loaded and executed by the processor to implement the resource configuration method as described in the above aspects.

According to another aspect of this application, a non-transitory computer-readable storage medium is provided, the non-transitory computer-readable storage medium storing at least one computer program, the at least one computer program being loaded and executed by a processor of a computer device to implement the resource configuration method described in the foregoing aspects.

DESCRIPTION OF EMBODIMENTS

To make objectives, technical solutions, and advantages of this application clearer, the following further describes implementations of this application in detail with reference to the accompanying drawings.

Figure 1:
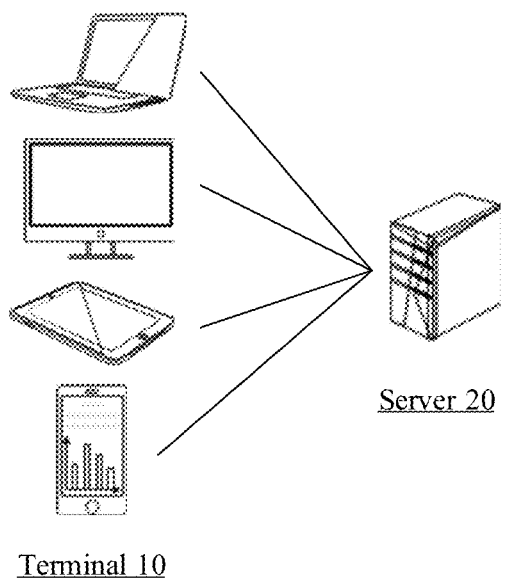
FIG. 1 is a schematic diagram of an implementation environment according to an exemplary embodiment of this application.

FIG. 1 shows a schematic diagram of an implementation environment according to an embodiment of this application. The implementation environment may include a terminal 10 and a server 20.

The terminal 10 may be a desktop computer, a portable laptop computer, a mobile phone, a tablet computer, an ebook reader, a Moving Picture Experts Group Audio Layer III (MP3) player, a Moving Picture Experts Group Audio Layer IV (MP4) player, or the like. This is not limited in this embodiment of this application.

In some embodiments, a client of a target application is installed and run on the terminal 10. The target application may be a game application, such as a Third Person Shooting (TPS) Game, a First Person Shooting (FPS) Game, a Multiplayer Online Battle Arena (MOBA) game or a multiplayer gunfight survival game. In addition, the target application may also be an instant messaging application, a video application, a social application, a multimedia application, a shopping application, a payment application, a life service application, or the like. This is not limited in this embodiment of this application.

In some embodiments, more than one terminal 10 is provided.

The server 20 may communicate with the terminal 10 through a wired or wireless network.

In some embodiments, the server 20 may be an independent physical server, may be a server cluster formed by a plurality of physical servers or a distributed system, or may be a cloud server providing basic cloud computing services such as a cloud service, a cloud database, cloud computing, a cloud function, cloud storage, a network service, cloud communication, a middleware service, a domain name service, a security service, a Content Delivery Network (CDN), big data and an artificial intelligence platform, which is not limited in the embodiments of this application.

The technical solutions of this application are described below by using several embodiments.

Figure 2:
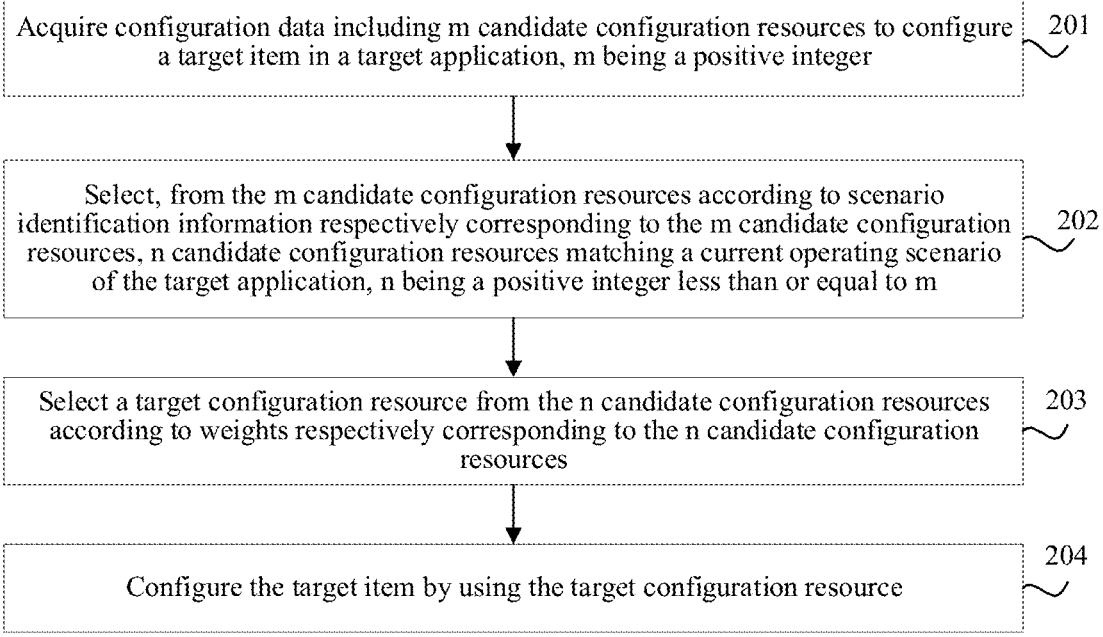
FIG. 2 is a flowchart of a resource configuration method according to an exemplary embodiment of this application.

FIG. 2 is a flowchart of a resource configuration method according to an exemplary embodiment of this application. This embodiment is mainly illustrated with an example in which the method is applied to the terminal 10 shown in FIG. 1. A client of a target application is installed and run on the terminal 10. The method may include the following steps:

Step 201. Acquire configuration data including m candidate configuration resources to configure a target item in a target application, m being a positive integer. In some embodiments, the target application is a game application.

A client of a target application is installed and run on the terminal. The target application has been introduced above and is not described in detail herein.

The client may communicate with a server through a network, so that the client may acquire the configuration data from the server based on the network.

The configuration data refers to some parameters for implementing related functions of the target application. The configuration data includes candidate configuration resources to configure at least one item in the target application. The target application may include a plurality of items needing to be configured. In an example, the target application is a game application, and the items needing to be configured may include an interface display item, an interface text item, a sound item and the like. The interface display item refers to a user interface displayed by the game application at runtime. The interface text item refers to some text descriptions included in the user interface displayed by the game application at runtime. The sound item refers to sound in the game application.

The target item may be any one of the plurality of items. The target item may include a plurality of candidate configuration resources. The plurality of candidate configuration resources are different from one another and may be configured for the target item under different conditions. In an example, the target application is a game application and the target item is an interface display item corresponding to the game application, the m candidate configuration resources in the configuration data that configure the target item may be m different pictures and configured for the target item under different conditions, so that the game application can display different pictures on different user interfaces. Illustratively, the m candidate configuration resources in the configuration data that configure the target item may be m animations and configured for the target item under different conditions, so that the game application can display different animations on different user interfaces. Illustratively, the m candidate configuration resources in the configuration data that configure the target item may be m different videos and configured for the target item under different conditions, so that the game application can display different videos on different user interfaces.

Step 202. Select, from the m candidate configuration resources according to scenario identification information respectively corresponding to the m candidate configuration resources, n candidate configuration resources matching a current operating scenario of the target application, n being a positive integer less than or equal to m.

The scenario identification information is indicating operating scenarios to which the candidate configuration resources are applicable. The operating scenarios refer to operating conditions of the client.

After the m candidate configuration resources are acquired, the n candidate configuration resources matching the current operating scenario of the target application are determined according to the scenario identification information respectively corresponding to the m candidate configuration resources. The current operating scenario refers to an operating scenario where the target application is currently located. The candidate configuration resources matching the current operating scenario refer to candidate configuration resources applicable to the current running scenario.

Step 203. Select a target configuration resource from the n candidate configuration resources according to weights respectively corresponding to the n candidate configuration resources.

The weights are indicating probabilities of selection of the candidate configuration resources. After the n candidate configuration resources are determined, the target configuration resource may be selected from the n candidate configuration resources according to the weights respectively corresponding to the n candidate configuration resources.

Step 204. Configure the target item by using the target configuration resource.

After the target configuration resource is determined, the target item may be configured by using the target configuration resource.

In summary, in the technical solution according to the embodiment of this application, through a correspondence between scenario identification information and configuration resources of the target application in different scenarios, the client of the target application, after acquiring the m candidate configuration resources, selects, according to the scenario identification information, the n candidate configuration resources matching the current operating scenario, and further determines the target configuration resource by using the weights respectively corresponding to the n candidate configuration resources.

Figure 3:
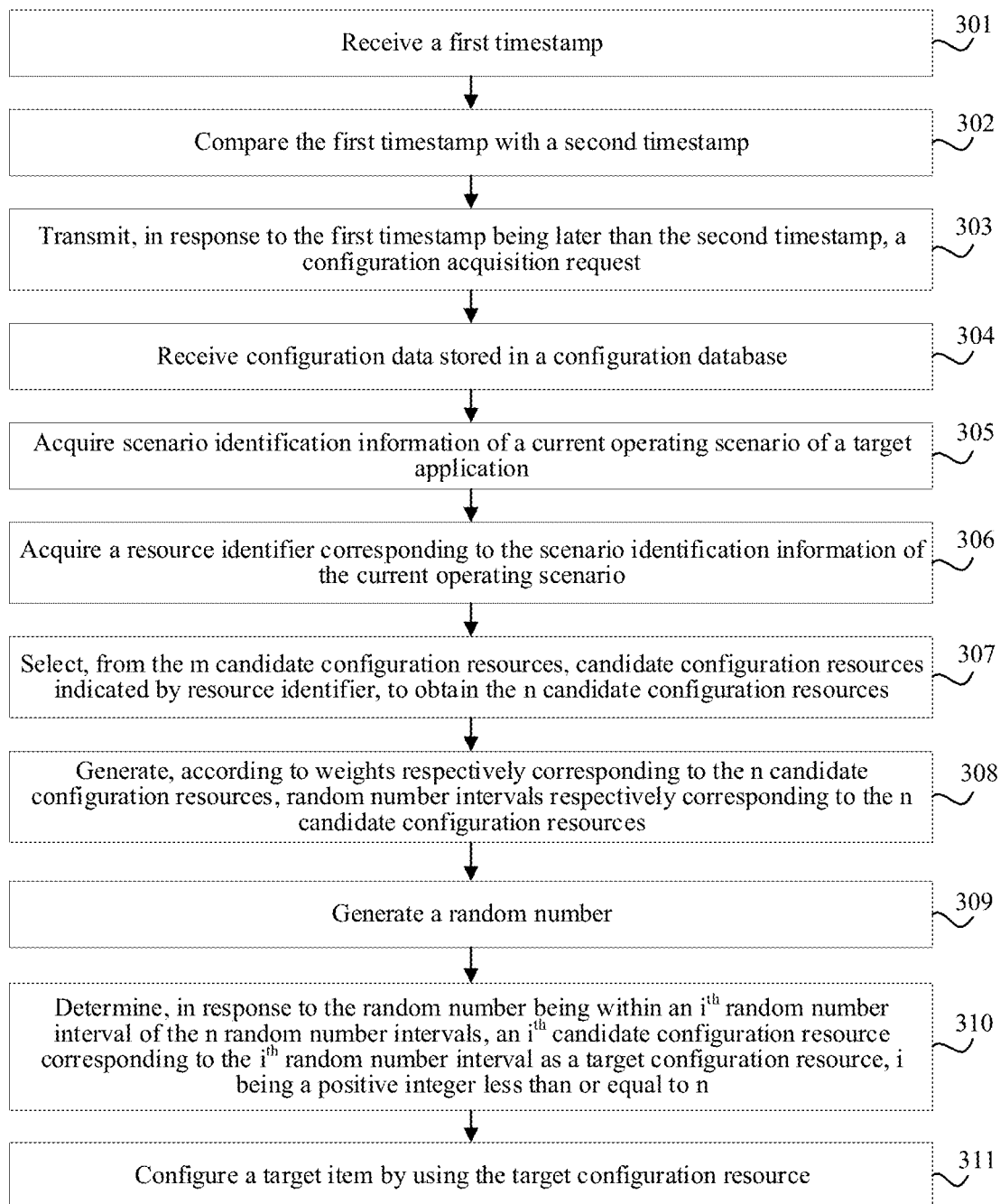
FIG. 3 is a flowchart of a resource configuration method according to another exemplary embodiment of this application.

FIG. 3 is a flowchart of a resource configuration method according to another exemplary embodiment of this application. This embodiment is mainly illustrated with an example in which the method is applied to the terminal 10 shown in FIG. 1. A client of a target application is installed and run on the terminal 10. The method may include the following steps:

Step 301. Receive a first timestamp.

A user, when running the client of the target application, may log in to a user account used by the user in the target application, and then may receive the first timestamp transmitted by the server.

In some embodiments, the first timestamp transmitted by the server may also be received the first time the client of the target application starts running.

The first timestamp is indicating a moment at which configuration data stored in a configuration database is last updated. The configuration database is configured to store the configuration data. A developer of the target application may update the configuration data according to an actual requirement during item development of the target application.

In some embodiments, after the configuration data is updated, the configuration database may transmit to the server the moment at which the configuration data is last updated, that is, the first timestamp. Correspondingly, the server may receive the first timestamp, so that the first timestamp may later be transmitted to the client.

Step 302. Compare the first timestamp with a second timestamp.

After the first timestamp is acquired, the first timestamp may be compared with the second timestamp. The second timestamp is indicating a moment at which configuration data locally stored is last updated. "Locally stored" refers to storage performed by the client of the target application.

In some embodiments, each time the configuration data is acquired, the client may locally store the configuration data and correspondingly record the moment at which the configuration data is last updated in the configuration database.

In some embodiments, the client may locally store the configuration data in a format of JavaScript Object Notation (json). json is a lightweight data exchange format. In some other embodiments, the configuration data may also be stored in another format, which is not limited in the embodiment of this application.

Step 303. Transmit, in response to the first timestamp being later than the second timestamp, a configuration acquisition request.

When the first timestamp is later than the second timestamp, the configuration data under the first timestamp is the latest configuration data.

In this case, the client may transmit the configuration acquisition request to the server. The configuration acquisition request is configured to request acquisition of the configuration data stored in the configuration database.

In some embodiments, when the first timestamp is earlier than or equal to the second timestamp, indicating that configuration data currently locally stored is the same as configuration data currently stored in the configuration database, the configuration acquisition request may not be transmitted to the server.

Step 304. Receive the configuration data stored in the configuration database.

The server, after receiving the configuration acquisition request, may acquire the configuration data from the configuration database, and transmit the acquired configuration data to the client. That is, the client may receive the configuration data stored in the configuration database and transmitted by the server.

In some embodiments, the client may further update the second timestamp after receiving the configuration data stored in the configuration database and transmitted by the server.

The configuration data is acquired when the first timestamp is later than the second timestamp, which prevents a waste of network resources and a waste of server resources caused by configuration data pulling in each login to the client.

Figure 4:
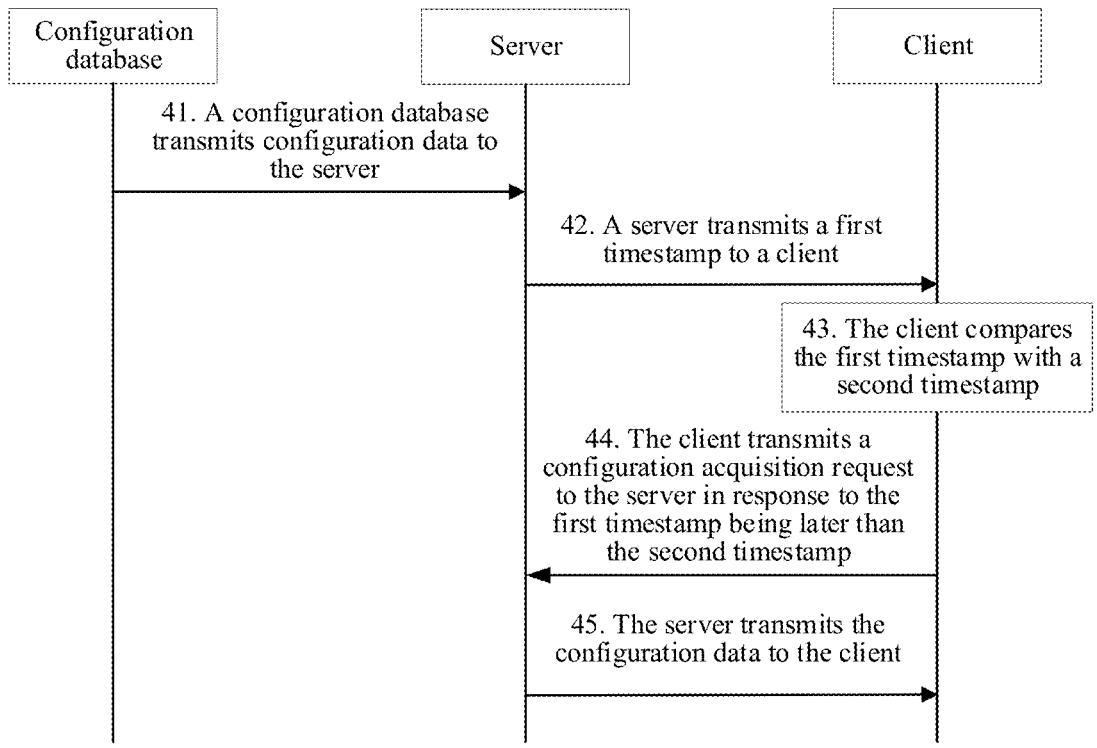
FIG. 4 is a flowchart of acquisition of configuration data by a client according to an exemplary embodiment of this application.

Illustratively, FIG. 4 is a flowchart of acquisition of configuration data by a client. The method for acquiring, by a client, configuration data includes the following sub-steps: Step 41. The configuration database transmits the configuration data to the server, and correspondingly, the server receives the configuration data. Step 42. The server transmits the first timestamp to the client, and correspondingly, the client receives the first timestamp transmitted by the server. Step 43. The client compares the first timestamp with a second timestamp. Step 44. The client transmits a configuration acquisition request to the server in response to the first timestamp being later than the second timestamp, and correspondingly, the server receives the configuration acquisition request transmitted by the client. Step 45. The server transmits the configuration data to the client, and correspondingly, the client receives the configuration data.

Step 305. Acquire scenario identification information of a current operating scenario of a target application.

After the configuration data is acquired, the n candidate configuration resources matching the current operating scenario of the target application may be selected from the m candidate configuration resources according to the scenario identification information respectively corresponding to the m candidate configuration resources. The configuration data includes the m candidate configuration resources to configure a target item in the target application. m is a positive integer, and n is a positive integer less than or equal to m.

The client needs to acquire the scenario identification information of the current operating scenario of the target application. The scenario identification information is indicating operating scenarios to which the candidate configuration resources are applicable.

In some embodiments, the acquiring scenario identification information of a current operating scenario of a target application may include the following steps:

(1) Acquire a scenario factor corresponding to the current operating scenario of the target application.

The scenario factor is indicating attributes of the operating scenario. The scenario factor includes at least one of the following: a region factor, a mode factor, a time factor, a function factor, and an emotion factor. The region factor is indicating where the target application is distributed, such as South Korea, Vietnam, Taiwan, and so on. The mode factor is indicating a mode in which the target application is currently located. For example, the target is a game application, and the mode factor may include a confrontation mode, a battle mode, a combat mode, and the like. The time factor is indicating run time of the current target application. The function factor is indicating different functional modules in the target application. The emotion factor is indicating content of different emotion types in the target application.

(2) Determine the scenario identification information of the current operating scenario according to an identifier of the scenario factor.

The identifier of the scenario factor is configured to identify the scenario factor. The scenario identification information of the current operating scenario is determined through the identifier of the scenario factor.

In some embodiments, the determining the scenario identification information of the current operating scenario according to an identifier of the scenario factor includes: splicing the identifier of the scenario factor to obtain the scenario identification information of the current operating scenario. For example, the scenario factor corresponding to the current operating scenario includes a region factor and a mode factor, an identifier of the region factor and an identifier of the mode factor may be spliced, and a splicing result is taken as the scenario identification information of the current operating scenario.

In some embodiments, the mode factor may also be a mode combination factor. For example, a first mode factor corresponding to the confrontation mode and a second mode factor corresponding to the battle mode are spliced to obtain the mode combination factor.

If the scenario factor corresponding to the current operating scenario includes one item, such as the region factor, an identifier of the region factor is directly determined as the scenario identification information of the current operating scenario.

Resource configuration considering the region factor and the mode factor may be differentiated by application distribution regions and models.

The configuration data may include a first configuration table and a second configuration table. The first configuration table includes candidate configuration resources, resource identifiers of the candidate configuration resources, weights of the candidate configuration resources, an effective period of candidate resources (including an effective start time and an effective end time), and the like. The second configuration table includes scenario identification information, resource identifiers of the candidate configuration resources, and the like.

Illustratively, for example, the target application is a game application, the resources are picture sources, and the scenario factor includes the region factor and the mode factor. Table-1 illustratively shows an example of the first configuration table.

TABLE 1

| Resource identifier | Picture resource | Weight | Start time | End time |
|---|---|---|---|---|
| 1 | https://www.pubgmobile.com/event/pics/loading/loading15.jpg | 1 | 10/1/2019, 12:00:00 AM | 7/15/2030, 12:00:00 AM |
| 2 | https://www.pubgmobile.com/event/pics/loading/loading32.jpg | 100 | 4/1/2019, 12:00:00 AM | 4/3/2030, 11:59:59 PM |

TABLE 1-continued

| Resource identifier | Picture resource | Weight | Start time | End time |
|---|---|---|---|---|
| 3 | https://www.pubgmobile.com/event/pics/loading/loading34.jpg | 100 | 4/4/2019, 12:00:00 AM | 4/5/2030, 11:59:59 PM |
| 4 | https://www.pubgmobile.com/event/pictures/events/blackandwhitewhoareyou.jig | 150 | 2019-14-18 00:00:00 | 4/20/2030, 11:59:59 PM |

The first column of IDs denotes resource identifiers of candidate picture resources, the second column are picture resources, the third column are weights of the candidate picture resources, the fourth column are effective start times of candidate resources, and the fifth column are effective end times of the candidate resources.

Table-2 illustratively shows an example of the second configuration table.

TABLE 2

| Scenario identification information | Identifier of region factor | Identifier of mode factor | Mode name | Resource identifier |
|---|---|---|---|---|
| GLOBAL 1 | GLOBAL | 1 | Global Erangel | 1; 2 |
| DEFAULT | | 9999 | Default mode configuration | 4 |

The first column is scenario identification information obtained by splicing an identifier of the region factor and an identifier of the mode factor. The second column is the identifier of the region factor. The third column is the identifier of the mode factor. The identifier of the mode factor may be represented by an identifier of the mode combination factor. A correspondence between the identifier of the mode factor and the identifier of the mode combination factor is represented by Table-3.

TABLE 3

| Identifier of mode factor | Note | Identifier of mode combination factor |
|---|---|---|
| 101 | Single-player configuration for battle mode | 1 |
| 102 | Two-player configuration for battle mode | 1 |
| 103 | Four-player configuration for battle mode | 1 |

Table-4 illustratively shows another example of the second configuration table.

TABLE 4

| Identifier of region factor | Code of region factor | Region name | Resource identifier |
|---|---|---|---|
| GLOBAL | 840 | Global | 1; 2; 3; 4 |
| KOREA | 410 | Korea | 1 |
| JAPAN | 392 | Japan | 2; 3 |
| VNG | 422 | Vietnam | 1; 4 |
| TW | 156 | Taiwan | 3; 4 |
| CE | 344 | CE | 2; 4 |
| DEFAULT | 9999 | Default region configuration | 4 |

Step 306. Acquire a resource identifier corresponding to the scenario identification information of the current operating scenario.

The resource identifier corresponding to the scenario identification information is acquired after the scenario identification information of the current operating scenario is determined. The resource identifier is configured to uniquely identify the configuration resource.

Illustratively, as shown in Table-2, assuming that the scenario identification information "GLOBAL1" is obtained by splicing the identifier "GLOBAL" of the region factor and the identifier "1" of the mode factor, the resource identifier (index ID sequence) corresponding to the scenario identification information "GLOBAL1" includes 1 and 2.

Step 307. Select, from the m candidate configuration resources, candidate configuration resources indicated by the resource identifier, to obtain the n candidate configuration resources.

After the resource identifier corresponding to the scenario identification information of the current operating scenario is acquired, candidate configuration resources indicated by the resource identifiers are selected from the m candidate configuration resources to obtain the n candidate configuration resources.

Illustratively, as shown in Table-2, assuming that the resource identifier includes 1 and 2, two candidate configuration resources, whose resource identifiers are 1 and 2, of the m candidate configuration resources are taken as the n candidate configuration resources.

In some implementations, the resource identifier is acquired using default identification information if the resource identifier cannot be acquired using the scenario identification information.

As shown in Table-2 and Table-4, the resource identifier acquired by DEFAULT is 4, candidate configuration resources with the resource identifier of 4 are taken as the n candidate configuration resources.

In some implementations, after the n candidate configuration resources are obtained from the m candidate configuration resources, the following steps may also be performed: acquiring effective times respectively corresponding to the n candidate configuration resources; and selecting, from the n candidate configuration resources according to the effective times respectively corresponding to the n candidate configuration resources, k candidate configuration resources valid at a current moment, k being a positive integer less than or equal to n.

Since the candidate configuration resources have effective times, the k candidate configuration resources valid at the current moment are selected from the n candidate configuration resources according to the effective times respectively corresponding to the n candidate configuration resources, so as to select a target configuration resource from the k candidate configuration resources.

In some embodiments, the steps of acquiring effective times respectively corresponding to the n candidate configuration resources; and selecting, from the n candidate configuration resources according to the effective times respectively corresponding to the n candidate configuration resources, k candidate configuration resources valid at a current moment may also be performed before step 305, which is not limited in the embodiment of this application.

The candidate configuration resources are further screened using the effective times, and resource configuration within the time limit may be realized, so that resources not within the effective times (such as before or after the effective times) are not configured.

Step 308. Generate, according to the weights respectively corresponding to the n candidate configuration resources, random number intervals respectively corresponding to the n candidate configuration resources.

After the n candidate configuration resources are determined, the weights respectively corresponding to the n candidate configuration resources may be acquired according to the first configuration table. The weights are indicating probabilities of selection of the candidate configuration resources.

Then, the random number intervals respectively corresponding to the n candidate configuration resources may be generated according to the weights respectively corresponding to the n candidate configuration resources. In some embodiments, lengths and weights of the random number intervals are positively correlated.

In some embodiments, the generating, according to the weights respectively corresponding to the n candidate configuration resources, random number intervals respectively corresponding to the n candidate configuration resources includes the following steps:

(1) Add the weights respectively corresponding to the n candidate configuration resources to obtain a weight sum.

(2) Determine a total random number interval according to the weight sum.

(3) Divide, according to the weights respectively corresponding to the n candidate configuration resources, the total random number interval to obtain the random number intervals respectively corresponding to the n candidate configuration resources.

Figure 5:
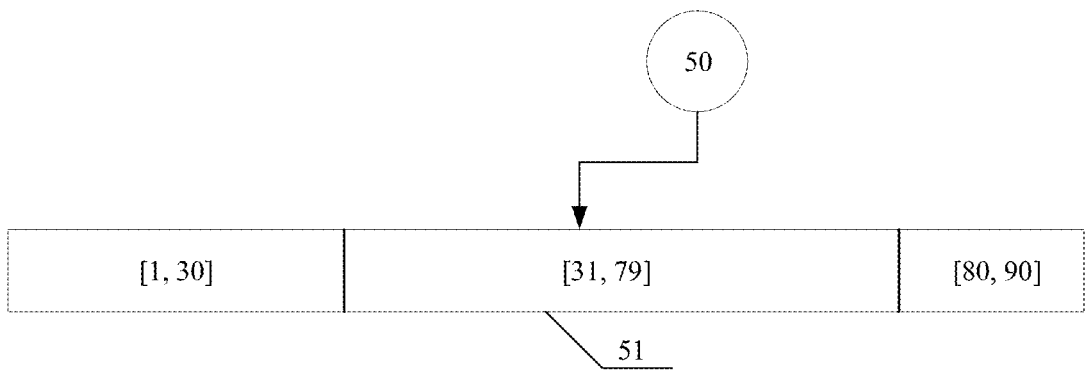
FIG. 5 is a schematic diagram of a random number interval according to an exemplary embodiment of this application.

Illustratively, as shown in FIG. 5, assuming that n is equal to 3 and weights of the 3 candidate configuration resources are respectively 30, 49 and 11, the weights respectively corresponding to the 3 candidate configuration resources are added to obtain a weight sum, that is, 30+49+11=90. Then, a total random number interval is determined as [1, 90]. Combined with the weights of the 3 candidate configuration resources, the total random number interval [1, 90] is divided into 3 random number intervals, [1, 30], [31, 79] and [80, 90].

Step 309. A random number is generated.

The random number may be any number in the total random number interval.

Step 310. Determine, in response to the random number being within an $i^{th}$ random number interval of the n random number intervals, an $i^{th}$ candidate configuration resource corresponding to the $i^{th}$ random number interval as the target configuration resource, i being a positive integer less than or equal to n.

After a random number is generated, it is determined that the random number is within the $i^{th}$ random number interval of the n random number intervals. Since each random number interval corresponds to one candidate configuration resource, an $i^{th}$ candidate configuration resource corresponding to the $i^{th}$ random number interval may be determined as the target configuration resource after it is determined that the random number is within the $i^{th}$ random number interval.

Illustratively, still referring to FIG. 5, assuming that the random number is 50 which falls within the second random number interval [31, 79], a candidate configuration resource corresponding to the second random number 51 is the target configuration resource.

Step 311. Configure the target item by using the target configuration resource.

This step is the same as or similar to step 204 in the embodiment of FIG. 2, and is not described in detail herein.

In some embodiments, after the target configuration resource is determined, it is determined whether the target configuration resource is a local resource or a network resource. If the target configuration resource is the local resource, the target item may be configured directly using the target configuration resource. If the target configuration resource is the network resource and has not been locally downloaded, firstly, the target configuration resource is downloaded from the server and locally stored, and then the target item is configured using the target configuration resource.

Illustratively, in an example, the target configuration resource is a picture source. If the picture resource is a picture locally stored or cached, the picture is directly displayed. If the picture resource is a picture in a hypertext transport protocol (http) format and has not been locally downloaded, the picture resource is downloaded from the server (such as a picture server) and then loaded and displayed.

Further, the configuration data is acquired when the first timestamp is later than the second timestamp, which prevents a waste of network resources and a waste of server resources caused by configuration data pulling in each login to the client.

Besides, the candidate configuration resources are further screened using the effective times, and resource configuration within the time limit may be realized, so that resources not within the effective times (such as before or after the effective times) are not configured.

In addition, resource configuration considering the region factor and the mode factor may be differentiated by application distribution regions and models.

Figure 6:
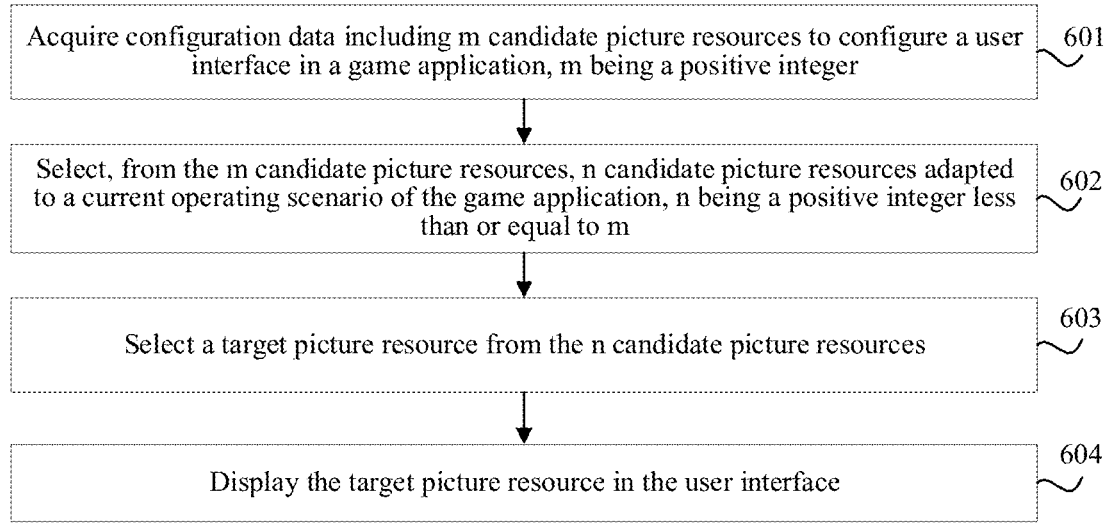
FIG. 6 is a flowchart of a resource configuration method according to another exemplary embodiment of this application.

FIG. 6 is a flowchart of a resource configuration method according to another exemplary embodiment of this application. This embodiment is mainly illustrated with an example in which the method is applied to the terminal 10 in the implementation environment shown in FIG. 1. A client of a target application (such as a game application) is installed and run on the terminal 10. The method may include the following steps:

Step 601. Acquire configuration data including m candidate picture resources to configure a user interface in a game application, m being a positive integer.

The client of the target application may be installed and run on the terminal. The target application may be a game application. Display of a user interface of the game application depends on picture resources.

The client of the game application acquires configuration data from the server based on the network. The configuration data includes a plurality of candidate picture resources to configure the user interface in the game application.

In some embodiments, the configuration data further includes a plurality of configuration resources to configure other items in the game application, which is not limited in the embodiment of this application.

Illustratively, a code format of the configuration data is as follows:

```
cfg = (
    {
        "SheetInfo":
            ["loading 图索引表.xls", " 图片库", "LoadingPicsCfg", "ID"],
        "NameMap":
            [
                ["ID", "ID", "number"],
                [" 图片资源", "path", "string"],
                [" 权重", "weight", "number"],
                [" 开始生效时间", "start_time", "string"],
                [" 结束生效时间", "end_time", "string"],
            ]
    },
    {
        "SheetInfo":
            ["loading 图索引表.xls", " 战斗 loading 索引",
"LoadingBattleCfg", " 拼接 key"],
        "NameMap":
            [
                [" 拼接 key", "ID", "string"],
                [" 索引 id 序列", "pictures", "string"],
            ]
    },
    {
        "SheetInfo":
            ["loading 图索引表.xls", " 登录 loading 索引",
"LoadingLoginCfg", " 发布地区 "],
        "NameMap":
            [
                [" 发布地区 ", "ID", "string"],
                [" 索引 id 序列", "pictures", "string"],
            ]
    },
    {
        "SheetInfo":
            ["loading 图索引表.xls", " 模式索引 ",
```

```
"LoadingMode2GroupCfg", "主模式 id"],
    "NameMap":
        [
            ["主模式 id", "modeID", "number"],
            ["模式组合 id", "groupID", "number"],
        ]
},
)
```

Step 602. Select, from the m candidate picture resources, n candidate picture resources adapted to a current operating scenario of the game application, n being a positive integer less than or equal to m.

After the m candidate picture resources are acquired, the n candidate picture resources adapted to the current operating scenario of the game application are selected from the m candidate picture resources.

A detailed process of selecting, from the m candidate picture resources, n candidate picture resources adapted to a current operating scenario of the game application is the same as or similar to steps 305 to 307 in the embodiment of FIG. 3, which is not described in detail herein.

Step 603. Select a target picture resource from the n candidate picture resources.

Then, the target picture resource is further determined from the n candidate picture resources.

A detailed process of selecting a target picture resource from the n candidate picture resources is the same as or similar to steps 308 to 311 in the embodiment of FIG. 3, which is not described in detail herein.

Step 604. Display the target picture resource in the user interface.

After the target picture resource is determined, the target picture resource is displayed in the user interface.

In some embodiments, if the picture resource is a picture locally stored or cached, the picture is directly displayed. If the picture resource is a picture in an http format and has not been locally downloaded, the picture resource is downloaded from the server (such as a picture server) and then loaded and displayed.

Figure 7:
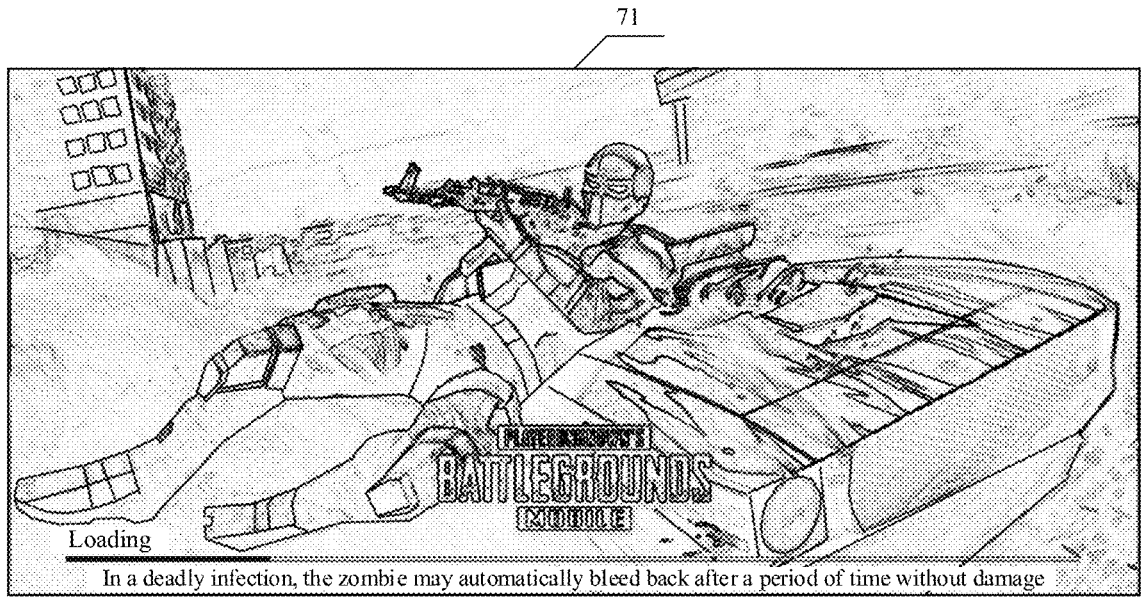
FIG. 7 is a schematic diagram of a user interface according to an exemplary embodiment of this application.
Figure 8:
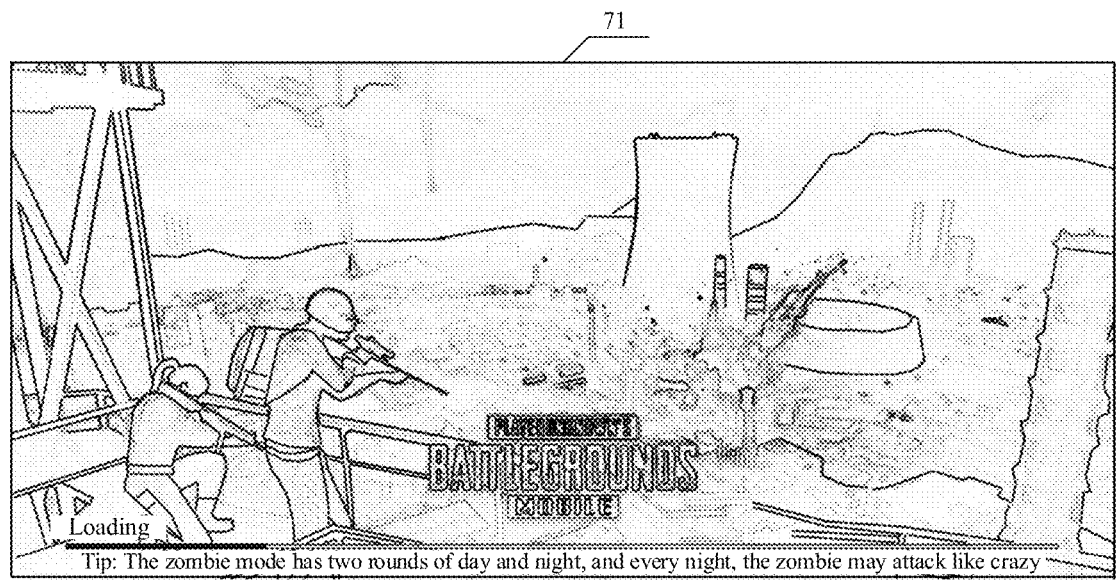
FIG. 8 is a schematic diagram of a user interface according to another exemplary embodiment of this application.

Illustratively, as shown in FIG. 7 and FIG. 8, picture resources displayed in a user interface 71 are obtained based on a network server. The display in the user interface may be dynamically changed when configuration data is updated.

In summary, in the technical solution according to the embodiment of this application, through a correspondence between scenario identification information and picture resources of the game application in different scenarios, the client of the game application, after acquiring the m candidate picture resources, selects, according to the scenario identification information, the n candidate picture resources matching the current operating scenario, and further determines the target picture resource by using weights respectively corresponding to the n candidate picture resources.

The following is an apparatus embodiment of this application, which can be configured to execute the method embodiments of this application. For details not disclosed in the apparatus embodiments of this application, refer to the method embodiments of this application.

Figure 9:
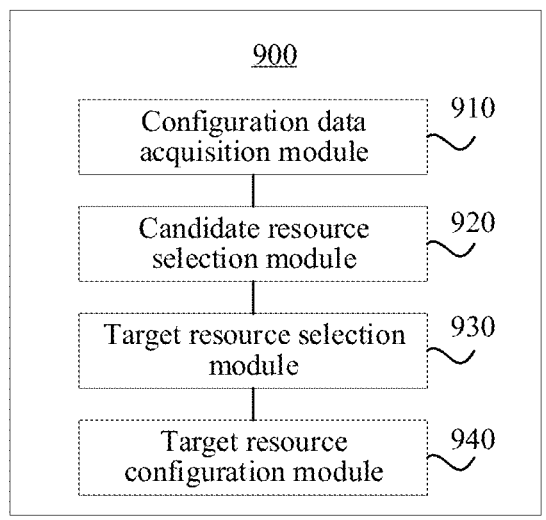
FIG. 9 is a block diagram of a resource configuration apparatus according to an exemplary embodiment of this application.

FIG. 9 is a block diagram of a resource configuration apparatus according to an exemplary embodiment of this application. The apparatus has functions of implementing the foregoing resource configuration method examples. The functions may be implemented by hardware, or may be implemented by hardware executing corresponding software. The apparatus may be the terminal described above, or may be disposed on the terminal. The apparatus 900 may include: a configuration data acquisition module 910, a candidate resource selection module 920, a target resource selection module 930, and a target resource configuration module 940.

The configuration data acquisition module 910 is configured to acquire configuration data including m candidate configuration resources to configure a target item in a target application, m being a positive integer.

The candidate resource selection module 920 is configured to select, from the m candidate configuration resources according to scenario identification information respectively corresponding to the m candidate configuration resources, n candidate configuration resources matching a current operating scenario of the target application, the scenario identification information indicating operating scenarios to which the candidate configuration resources are applicable, n being a positive integer less than or equal to m.

The target resource selection module 930 is configured to select a target configuration resource from the n candidate configuration resources according to weights respectively corresponding to the n candidate configuration resources, the weights indicating probabilities of selection of the candidate configuration resources.

The target resource configuration module 940 is to configure the target item by using the target configuration resource.

In summary, in the technical solution according to the embodiment of this application, through a correspondence between scenario identification information and configuration resources of the target application in different scenarios, the client of the target application, after acquiring the m candidate configuration resources, selects, according to the scenario identification information, the n candidate configuration resources matching the current operating scenario, and further determines the target configuration resource by using weights respectively corresponding to the n candidate configuration resources.

Figure 10:
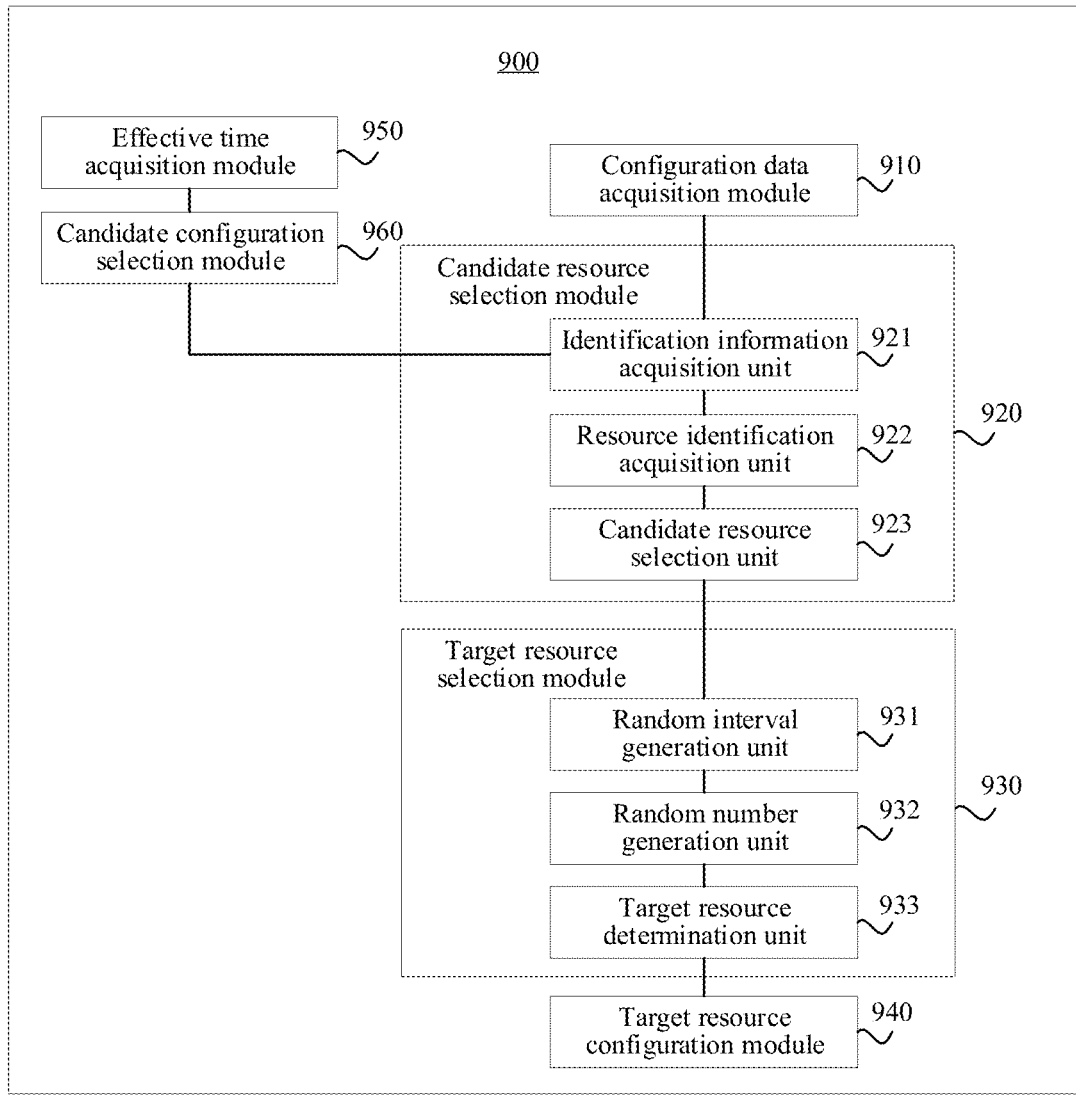
FIG. 10 is a block diagram of a resource configuration apparatus according to another exemplary embodiment of this application.

In some possible designs, as shown in FIG. 10, the candidate resource selection module 920 includes: an identification information acquisition unit 921, a resource identifier acquisition unit 922, and a candidate resource selection unit 923.

The identification information acquisition unit 921 is configured to acquire the scenario identification information of the current operating scenario of the target application.

The resource identifier acquisition unit 922 is configured to acquire a resource identifier corresponding to the scenario identification information of the current operating scenario.

The candidate resource selection unit 923 is configured to select, from the m candidate configuration resources, candidate configuration resources indicated by the resource identifier, to obtain the n candidate configuration resources.

In some possible designs, the identification information acquisition unit 921 is configured to acquire a scenario factor corresponding to the current operating scenario of the target application, the scenario factor including at least one of the following: a region factor, a mode factor, a time factor, a function factor, and an emotion factor; and determine the scenario identification information of the current operating scenario according to an identifier of the scenario factor.

In some possible designs, as shown in FIG. 10, the target resource selection module 930 includes: a random interval generation unit 931, a random number generation unit 932, and a target resource determination unit 933.

The random interval generation unit 931 is configured to generate, according to the weights respectively corresponding to the n candidate configuration resources, random number intervals respectively corresponding to the n candidate configuration resources.

The random number generation unit 932 is configured to generate a random number.

The target resource determination unit 933 is configured to determine, in response to the random number being within an $i^{th}$ random number interval of the n random number intervals, an $i^{th}$ candidate configuration resource corresponding to the $i^{th}$ random number interval as the target configuration resource, i being a positive integer less than or equal to n.

In some possible designs, the random interval generation unit 931 is configured to add the weights respectively corresponding to the n candidate configuration resources to obtain a weight sum; determine a total random number interval according to the weight sum; and divide, according to the weights respectively corresponding to the n candidate configuration resources, the total random number interval to obtain the random number intervals respectively corresponding to the n candidate configuration resources.

In some possible designs, the configuration data acquisition module 910 is configured to receive a first timestamp indicating a moment at which configuration data stored in a configuration database is last updated; compare the first timestamp with a second timestamp indicating a moment at which configuration data locally stored is last updated; transmit, in response to the first timestamp being later than the second timestamp, a configuration acquisition request configured to request acquisition of the configuration data stored in the configuration database; and receive the configuration data stored in the configuration database.

In some possible designs, as shown in FIG. 10, the apparatus 900 further includes:
 an effective time acquisition module 950 configured to acquire effective times respectively corresponding to the n candidate configuration resources; and
 a candidate configuration selection module 960 configured to select, from the n candidate configuration resources according to the effective times respectively corresponding to the n candidate configuration resources, k candidate configuration resources valid at a current moment, k being a positive integer less than or equal to n, and target configuration information being selected from the k candidate configuration resources.

Figure 11:
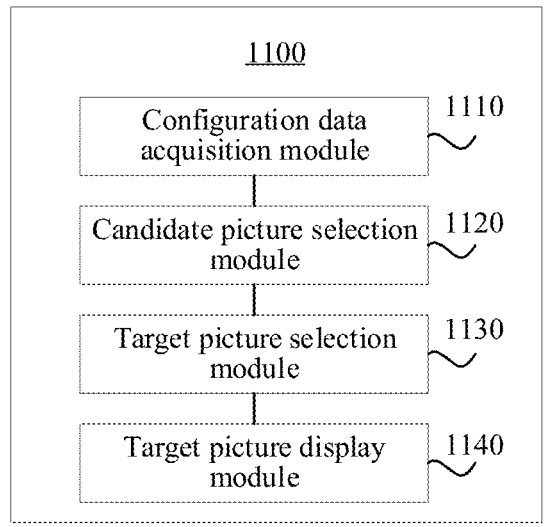
FIG. 11 is a block diagram of a resource configuration apparatus according to another exemplary embodiment of this application.

FIG. 11 is a block diagram of a resource configuration apparatus according to another exemplary embodiment of this application. The apparatus has functions of implementing the foregoing resource configuration method examples. The functions may be implemented by hardware, or may be implemented by hardware executing corresponding software. The apparatus may be the terminal described above, or may be disposed on the terminal. The apparatus 1100 may include: a configuration data acquisition module 1110, a candidate picture selection module 1120, a target picture selection module 1130, and a target picture display module 1140.

The configuration data acquisition module 1110 is configured to acquire configuration data including m candidate picture resources to configure a user interface in a game application, m being a positive integer.

The candidate picture selection module 1120 is configured to select, from the m candidate picture resources, n candidate picture resources adapted to a current operating scenario of the game application, n being a positive integer less than or equal to m.

The target picture selection module 1130 is configured to select a target picture resource from the n candidate picture resources.

The target picture display module 1140 is configured to display the target picture resource in the user interface.

In summary, in the technical solution according to the embodiment of this application, through a correspondence between scenario identification information and configuration resources of the game application in different scenarios, the client of the game application, after acquiring the m candidate picture resources, selects, according to the scenario identification information, the n candidate picture resources matching the current operating scenario, and further determines the target picture resource by using weights respectively corresponding to the n candidate picture resources.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
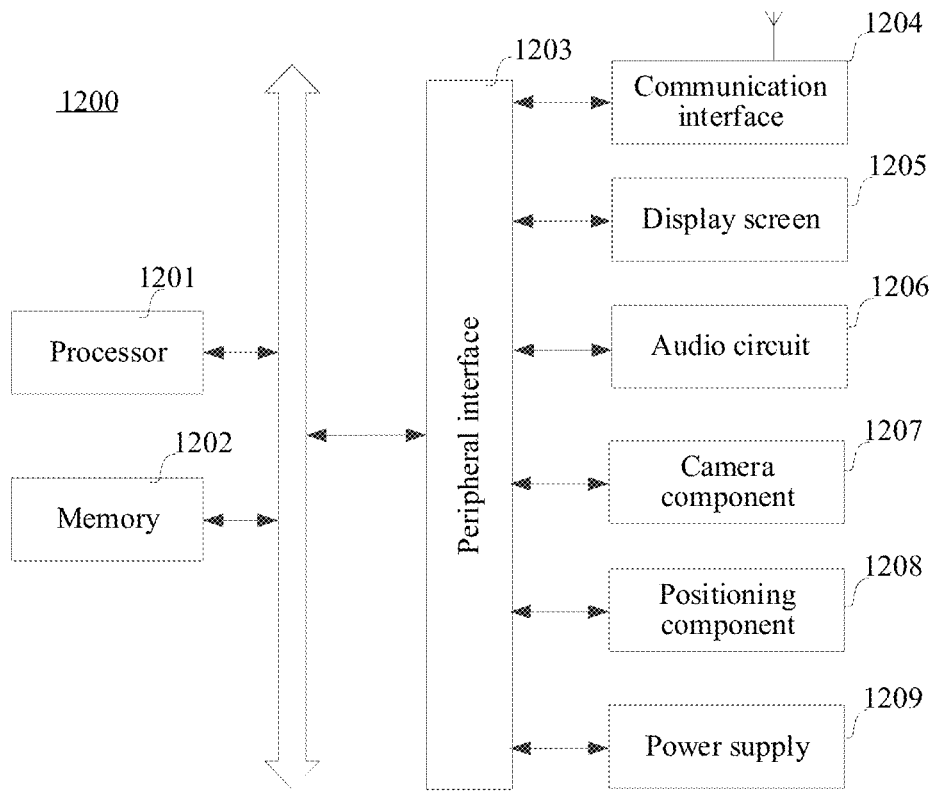
FIG. 12 is a structural block diagram of a terminal according to an exemplary embodiment of this application.

FIG. 12 is a structural block diagram of a terminal according to an exemplary embodiment of this application. Generally, the terminal 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field programmable gate array (FPGA), and a programmable logic array (PLA). The processor 1201 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1201 may be integrated with a graphics processing unit (GPU). The GPU is configured to render and draw content that needs to be displayed on a display. In some embodiments, the processor 1201 may further include an AI processor. The AI processor is configured to process computing operations related to ML.

The memory 1202 may include one or more computer-readable storage media that may be non-transitory. The memory 1202 may further include a high-speed random access memory (RAM), and a non-volatile memory such as one or more magnetic disk storage devices and a flash storage device. In some embodiments, the non-transient computer-readable storage medium in the memory 1202 is configured to store at least one instruction, at least one program, a code set or an instruction set. The at least one instruction, the at least one program, the code set or the instruction set is executed by the processor 1201 to implement the resource configuration method according to the method embodiment in this application.

In some embodiments, the terminal 1200 may include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral device may include: at least one of a communication interface 1204, a display screen 1205, an audio circuit 1206, a camera component 1207, a positioning component 1208, and a power supply 1209.

A person skilled in the art may understand that the structure shown in FIG. 12 does not constitute a limitation on the terminal 1200, and the terminal may include more components or fewer components than those shown in the figure, or some components may be combined, or a different component deployment may be used.

Figure 13:
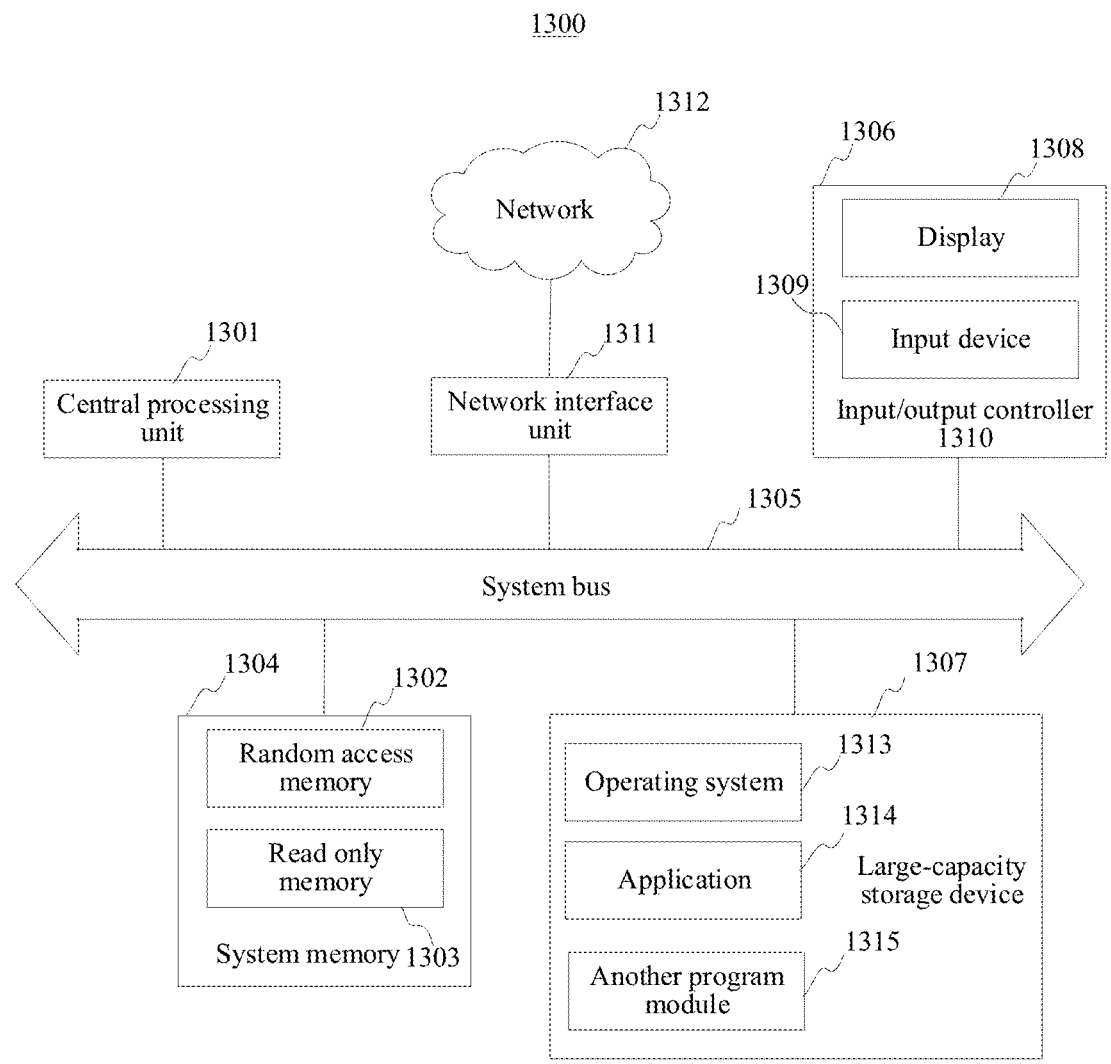
FIG. 13 is a schematic structural diagram of a server according to an exemplary embodiment of this application.

FIG. 13 is a schematic structural diagram of a server according to an exemplary embodiment of this application.

Specifically, the server 1300 includes a CPU 1301, a system memory 1304 including a RAM 1302 and a read-only memory (ROM) 1303, and a system bus 1305 connecting the system memory 1304 and the CPU 1301. The server 1300 further includes a basic input/output system (I/O system) 1306 assisting in transmitting information between devices in a computer, and a large-capacity storage device 1307 configured to store an operating system 1313, an application 1314 and another program module 1315.

The basic I/O system 1306 includes a display 1308 configured to display information and an input device 1309 configured for a user to input information, such as a mouse or a keyboard. The display 1308 and the input device 1309 are both connected to the CPU 1301 by using an I/O controller 1310 connected to the system bus 1305. The basic I/O system 1306 may further include the I/O controller 1310, to receive and process inputs from a plurality of other devices, such as the keyboard, the mouse, or an electronic stylus. Similarly, the I/O controller 1310 further provides an output to a display, a printer or another type of output device.

The large-capacity storage device 1307 is connected to the CPU 1301 by using a large-capacity storage controller (not shown) connected to the system bus 1305. The large-capacity storage device 1307 and an associated computer-readable medium provide non-volatile storage for the server 1300. That is, the mass storage device 1307 may include a computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an Erasable Programmable Read Only Memory (EPROM), a flash memory or other solid storage technologies; a CD-ROM, a Digital Video Disc (DVD) or other optical storages; and a cassette, a magnetic tape, a disk storage or other magnetic storage devices. Certainly, a person skilled in the art may learn that the computer storage medium is not limited to the foregoing several types. The system memory 1304 and the large-capacity storage device 1307 may be collectively referred to as a memory.

According to the embodiments of this application, the server 1300 may further be connected, by using a network such as the Internet, to a remote computer on the network and run. That is, the server 1300 may be connected to a network 1312 by using a network interface unit 1311 connected to the system bus 1305, or may be connected to another type of network or a remote computer system (not shown) by using the network interface unit 1311.

The memory further includes at least one instruction, at least one program, a code set or an instruction set. The at least one instruction, the at least one program, the code set or the instruction set are stored in the memory and configured to be executed by one or more processors to implement the resource configuration method described above.

In an exemplary embodiment, a computer device is further provided. The computer device may be a terminal or a server. The computer device includes a processor and a memory, the memory storing at least one instruction, at least one program, a code set or an instruction set, and the at least one instruction, the at least one program, the code set or the instruction set being loaded and executed by the processor to implement the resource configuration method described above.

In an exemplary embodiment, a computer-readable storage medium is further provided. The computer-readable storage medium stores at least one instruction, at least one program, a code set or an instruction set. The at least one instruction, the at least one program, the code set or the instruction set implements the resource configuration method described above when executed by a processor.

In an exemplary embodiment, a computer-readable storage medium is further provided. The computer-readable storage medium stores a computer program. The computer program, when executed by a processor, implements the resource configuration method described above.

In an exemplary embodiment, a computer program product is further provided. The computer program product includes computer instructions stored in a computer-readable storage medium. The processor of the computer device reads the computer instructions from the computer-readable storage medium. The processor executes the computer instructions to cause the computer device to perform the resource configuration method as described in the above aspects.

It is to be understood that the term "a/the plurality of" mentioned in this specification means two or more. The terms "and/or" describes an association relationship between associated objects and represents that three relationships may exist. For example, A and/or B may represent the following three cases: only A exists, both A and B exist, and only B exists. The character "/" generally indicates an "or" relationship between the associated objects.

The foregoing descriptions are merely exemplary embodiments of this application, but are not intended to limit this application. Any modification, equivalent replacement, or improvement made without departing from the spirit and principle of this application shall fall within the protection scope of this application.

What is claimed is:

1. A resource configuration method performed at a computer device, the method comprising:
acquiring, from a server, configuration data comprising m candidate configuration resources and weights respectively corresponding to the m candidate configuration resources to configure a target item in a target application, m being a positive integer and the target application being a game application and the candidate configuration resources being used for rendering different user interfaces of the game application;
selecting, from the m candidate configuration resources and according to scenario identification information respectively corresponding to the m candidate configuration resources, n candidate configuration resources in accordance with a determination that the n candidate configuration resources match a current operating scenario of the target application including a current playing status of a user of the computer device in the game application, the scenario identification information indicating operating scenarios to which the candidate configuration resources are applicable, n being a positive integer less than or equal to m;
selecting a target configuration resource from the n candidate configuration resources in accordance with a determination by the computer device that the weights respectively correspond to the n candidate configuration resources, the weights indicating probabilities of selection of the candidate configuration resources; and
configuring the target item by using the target configuration resource to render a new user interface of the game application matching the current operating scenario.

2. The method according to claim 1, wherein the selecting, from the m candidate configuration resources according to scenario identification information respectively corresponding to the m candidate configuration resources, n candidate configuration resources matching a current operating scenario of the target application comprises:
acquiring the scenario identification information of the current operating scenario of the target application;
acquiring a resource identifier corresponding to the scenario identification information of the current operating scenario; and
selecting, from the m candidate configuration resources, candidate configuration resources indicated by the resource identifier, to obtain the n candidate configuration resources.

3. The method according to claim 2, wherein the acquiring the scenario identification information of the current operating scenario of the target application comprises:
acquiring a scenario factor corresponding to the current operating scenario of the target application, the scenario factor comprising at least one of the following: a region factor, a mode factor, a time factor, a function factor, and an emotion factor; and
determining the scenario identification information of the current operating scenario according to the scenario factor.

4. The method according to claim 1, wherein the selecting a target configuration resource from the n candidate configuration resources according to the weights respectively corresponding to the n candidate configuration resources comprises:
generating, according to the weights respectively corresponding to the n candidate configuration resources, n random number intervals respectively corresponding to the n candidate configuration resources;
generating a random number; and
determining, in response to the random number being within an $i^{th}$ random number interval of the n random number intervals, an $i^{th}$ candidate configuration resource corresponding to the $i^{th}$ random number interval as the target configuration resource, i being a positive integer less than or equal to n.

5. The method according to claim 4, wherein the generating, according to the weights respectively corresponding to the n candidate configuration resources, n random number intervals respectively corresponding to the n candidate configuration resources comprises:
adding the weights respectively corresponding to the n candidate configuration resources to obtain a weight sum;
determining a total random number interval according to the weight sum; and
dividing, according to the weights respectively corresponding to the n candidate configuration resources, the total random number interval to obtain the random number intervals respectively corresponding to the n candidate configuration resources.

6. The method according to claim 1, wherein the acquiring configuration data comprises:
receiving a first timestamp indicating a moment at which configuration data stored in a configuration database is last updated;
comparing the first timestamp with a second timestamp indicating a moment at which configuration data locally stored is last updated;
transmitting, in response to the first timestamp being later than the second timestamp, a configuration acquisition request configured to request acquisition of the configuration data stored in the configuration database; and
receiving the configuration data stored in the configuration database.

7. The method according to claim 1, wherein after the selecting, from the m candidate configuration resources according to scenario identification information respectively corresponding to the m candidate configuration resources, n candidate configuration resources matching a current operating scenario of the target application, the method further comprising:
acquiring effective times respectively corresponding to the n candidate configuration resources; and
selecting, from the n candidate configuration resources according to the effective times respectively corresponding to the n candidate configuration resources, k candidate configuration resources valid at a current moment, k being a positive integer less than or equal to n,
and target configuration information being selected from the k candidate configuration resources.

8. A computer device, comprising a processor and a memory, the memory storing at least one program, and the at least one program being loaded and executed by the processor to perform a plurality of operations including:

acquiring, from a server, configuration data comprising m candidate configuration resources and weights respectively corresponding to the m candidate configuration resources to configure a target item in a target application, m being a positive integer and the target application being a game application and the candidate configuration resources being used for rendering different user interfaces of the game application;

selecting, from the m candidate configuration resources and according to scenario identification information respectively corresponding to the m candidate configuration resources, n candidate configuration resources in accordance with a determination that the n candidate configuration resources match a current operating scenario of the target application including a current playing status of a user of the computer device in the game application, the scenario identification information indicating operating scenarios to which the candidate configuration resources are applicable, n being a positive integer less than or equal to m;

selecting a target configuration resource from the n candidate configuration resources in accordance with a determination by the computer device that the weights respectively correspond to the n candidate configuration resources, the weights indicating probabilities of selection of the candidate configuration resources; and configuring the target item by using the target configuration resource to render a new user interface of the game application matching the current operating scenario.

9. The computer device according to claim 8, wherein the selecting, from the m candidate configuration resources according to scenario identification information respectively corresponding to the m candidate configuration resources, n candidate configuration resources matching a current operating scenario of the target application comprises:

acquiring the scenario identification information of the current operating scenario of the target application;

acquiring a resource identifier corresponding to the scenario identification information of the current operating scenario; and selecting, from the m candidate configuration resources, candidate configuration resources indicated by the resource identifier, to obtain the n candidate configuration resources.

10. The computer device according to claim 9, wherein the acquiring the scenario identification information of the current operating scenario of the target application comprises:

acquiring a scenario factor corresponding to the current operating scenario of the target application, the scenario factor comprising at least one of the following: a region factor, a mode factor, a time factor, a function factor, and an emotion factor; and determining the scenario identification information of the current operating scenario according to the scenario factor.

11. The computer device according to claim 8, wherein the selecting a target configuration resource from the n candidate configuration resources according to the weights respectively corresponding to the n candidate configuration resources comprises:

generating, according to the weights respectively corresponding to the n candidate configuration resources, n random number intervals respectively corresponding to the n candidate configuration resources;

generating a random number; and determining, in response to the random number being within an $i^{th}$ random number interval of the n random number intervals, an $i^{th}$ candidate configuration resource corresponding to the $i^{th}$ random number interval as the target configuration resource, i being a positive integer less than or equal to n.

12. The computer device according to claim 11, wherein the generating, according to the weights respectively corresponding to the n candidate configuration resources, n random number intervals respectively corresponding to the n candidate configuration resources comprises:

adding the weights respectively corresponding to the n candidate configuration resources to obtain a weight sum;

determining a total random number interval according to the weight sum; and dividing, according to the weights respectively corresponding to the n candidate configuration resources, the total random number interval to obtain the random number intervals respectively corresponding to the n candidate configuration resources.

13. The computer device according to claim 8, wherein the acquiring configuration data comprises:

receiving a first timestamp indicating a moment at which configuration data stored in a configuration database is last updated;

comparing the first timestamp with a second timestamp indicating a moment at which configuration data locally stored is last updated;

transmitting, in response to the first timestamp being later than the second timestamp, a configuration acquisition request configured to request acquisition of the configuration data stored in the configuration database; and receiving the configuration data stored in the configuration database.

14. The computer device according to claim 8, wherein the plurality of operations further comprise:

after selecting, from the m candidate configuration resources according to scenario identification information respectively corresponding to the m candidate configuration resources, n candidate configuration resources matching a current operating scenario of the target application:

acquiring effective times respectively corresponding to the n candidate configuration resources; and selecting, from the n candidate configuration resources according to the effective times respectively corresponding to the n candidate configuration resources, k candidate configuration resources valid at a current moment, k being a positive integer less than or equal to n, and target configuration information being selected from the k candidate configuration resources.

15. A non-transitory computer-readable storage medium, storing at least one computer program, the at least one computer program being loaded and executed by a processor of a computer device to perform a plurality of operations including:

acquiring, from a server, configuration data comprising m candidate configuration resources and weights respectively corresponding to the m candidate configuration resources to configure a target item in a target application, m being a positive integer and the target application being a game application and the candidate configuration resources being used for rendering different user interfaces of the game application;

selecting, from the m candidate configuration resources and according to scenario identification information respectively corresponding to the m candidate configuration resources, n candidate configuration resources in accordance with a determination that the n candidate configuration resources match a current operating scenario of the target application including a current playing status of a user of the computer device in the game application, the scenario identification information indicating operating scenarios to which the candidate configuration resources are applicable, n being a positive integer less than or equal to m;

selecting a target configuration resource from the n candidate configuration resources in accordance with a determination by the computer device that the weights respectively correspond to the n candidate configuration resources, the weights indicating probabilities of selection of the candidate configuration resources; and configuring the target item by using the target configuration resource to render a new user interface of the game application matching the current operating scenario.

16. The non-transitory computer-readable storage medium according to claim 15, wherein the selecting, from the m candidate configuration resources according to scenario identification information respectively corresponding to the m candidate configuration resources, n candidate configuration resources matching a current operating scenario of the target application comprises:

acquiring the scenario identification information of the current operating scenario of the target application;

acquiring a resource identifier corresponding to the scenario identification information of the current operating scenario; and selecting, from the m candidate configuration resources, candidate configuration resources indicated by the resource identifier, to obtain the n candidate configuration resources.

17. The non-transitory computer-readable storage medium according to claim 16, wherein the acquiring the scenario identification information of the current operating scenario of the target application comprises:

acquiring a scenario factor corresponding to the current operating scenario of the target application, the scenario factor comprising at least one of the following: a region factor, a mode factor, a time factor, a function factor, and an emotion factor; and determining the scenario identification information of the current operating scenario according to the scenario factor.

18. The non-transitory computer-readable storage medium according to claim 15, wherein the selecting a target configuration resource from the n candidate configuration resources according to the weights respectively corresponding to the n candidate configuration resources comprises:

generating, according to the weights respectively corresponding to the n candidate configuration resources, n random number intervals respectively corresponding to the n candidate configuration resources;

generating a random number; and determining, in response to the random number being within an $i^{th}$ random number interval of the n random number intervals, an $i^{th}$ candidate configuration resource corresponding to the $i^{th}$ random number interval as the target configuration resource, i being a positive integer less than or equal to n.

19. The non-transitory computer-readable storage medium according to claim 15, wherein the acquiring configuration data comprises:

receiving a first timestamp indicating a moment at which configuration data stored in a configuration database is last updated;

comparing the first timestamp with a second timestamp indicating a moment at which configuration data locally stored is last updated;

transmitting, in response to the first timestamp being later than the second timestamp, a configuration acquisition request configured to request acquisition of the configuration data stored in the configuration database; and receiving the configuration data stored in the configuration database.

20. The non-transitory computer-readable storage medium according to claim 15, wherein the plurality of operations further comprise:

after selecting, from the m candidate configuration resources according to scenario identification information respectively corresponding to the m candidate configuration resources, n candidate configuration resources matching a current operating scenario of the target application:

acquiring effective times respectively corresponding to the n candidate configuration resources; and selecting, from the n candidate configuration resources according to the effective times respectively corresponding to the n candidate configuration resources, k candidate configuration resources valid at a current moment, k being a positive integer less than or equal to n, and target configuration information being selected from the k candidate configuration resources.

* * * * *